(12) United States Patent
Gregor et al.

(10) Patent No.: US 6,198,871 B1
(45) Date of Patent: Mar. 6, 2001

(54) DEVICE FOR INSERTION AND OR EXTRACTION OF A CABLE, PARTICULARLY AN OPTICAL TRANSMISSION CABLE, INTO OR FROM A PIPE-SHAPED LINE

(75) Inventors: Paul Egon Gregor, Oberhausen; Lothar Gerhard Kuhn, Duisburg, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/213,436

(22) Filed: Dec. 17, 1998

(30) Foreign Application Priority Data

Dec. 17, 1997 (DE) ............................................ 297 22 107 U

(51) Int. Cl.[7] .................................................... G02B 6/00
(52) U.S. Cl. ............................ 385/147; 385/134; 385/138
(58) Field of Search ................................. 385/147, 134, 385/138, 53, 901

(56) References Cited

U.S. PATENT DOCUMENTS 4,342,475   8/1982   Moran .

5,191,633 * 3/1993   Von Bagh ............................ 385/147

FOREIGN PATENT DOCUMENTS

| 1 810 367 | 2/1960 | (DE) . |
|---|---|---|
| 30 01 226 A1 | 8/1980 | (DE) . |
| 31 40 928 A1 | 5/1983 | (DE) . |
| 42 03 718 A1 | 8/1993 | (DE) . |
| 0294243 | * 12/1988 | (EP) . |
| 0780942 | * 6/1997 | (EP) . |

* cited by examiner

*Primary Examiner*—Frank G. Font
*Assistant Examiner*—Sang H. Nguyen
(74) *Attorney, Agent, or Firm*—Sughrue, Mion, Zinn, Macpeak & Seas, PLLC

(57) ABSTRACT

A device for the insertion and/or removal of a cable (1), particularly an optical transmission cable, into or from a pipe-shaped line (3), has a flange-like housing (5) attached to the pipe-shaped line (3), at least one arched guide pipe (13) placed in the housing (5) and projecting into the line (3) for guiding the cable (1) through a bore (17) drilled into the wall of the line (3) as well as multiple ring-shaped sealing elements (21) tightly enclosing the inserted cable (1).

11 Claims, 4 Drawing Sheets

DEVICE FOR INSERTION AND OR EXTRACTION OF A CABLE, PARTICULARLY AN OPTICAL TRANSMISSION CABLE, INTO OR FROM A PIPE-SHAPED LINE

The present application is based on and claims priority from German Application No. 297 22 107.8, which is incorporated herein by reference.

BACKGROUND OF THE INVENTION

The invention concerns a device for the insertion and extraction of a cable, particularly an optical transmission cable, into or from a pipe-shaped line.

In the course of the introduction of new cable facilities for telecommunication by regional and local companies, consideration is given increasingly to alternatives to the conventional laying of telecommunication cable underground for economical and/or organizational reasons. One alternative laying technique for telecommunication cable of particular merit especially in economical terms is represented by the use of gas and water lines already in place in the mains of a city or town supply system. Such a solution is detailed in DE 30 01 226 A1. Aside from the reduction of costs associated with establishing a local or regional telecommunication network, the use of existing lines keeps excavation work to a minimum, so that the space assigned to vehicle traffic, which in many cities barely suffices, suffers little restriction. In addition, no significant problem is caused by the density of existing lines serving all conceivable supply and disposal functions, which instead may prove an asset.

For technical and organizational reasons, as well as for reasons connected with the rite of passage, setting up a telecommunication network using cable, with a comparably small exterior diameter, including the possibility of adding participants, who join the network in the future, is best accomplished by laying optical transmission cable in fresh water lines, for example, of the existing supply network. In this respect, it is of great importance to ascertain the drinking water neutrality of the cable material, particularly of the cable coating, as well as to ensure permanent impenetrability of the cable with regard to water steam. In addition, special care must be taken to see that no germ formation or other microbiological contamination occurs while inserting the cable into the line.

An additional difficulty of laying cable is represented by the fact that barriers or other blocking devices are placed at 150–250 m intervals in drinking water lines for the purpose of blocking the fresh water line. Wherever such devices are set up, the cable needs to circumvent the barriers without any compromising implications of a mechanical or optical nature. This is achieved by extracting the cable from the pipe-shaped line before the barrier and reinserting it into the pipe-shaped line behind the barrier. In addition, in order to set up and branch off participant lines, it is necessary to extract an optical cable from the pipe-shaped line or insert it into the pipe-shaped line.

SUMMARY OF THE INVENTION

Therefore, the goal of the present invention is to create a device enabling simple and inexpensive insertion and extraction of the cable into or from the pipe-shaped line, without incurring the risk of damage to the cable or leakage of the medium transported in the line.

According to the present invention, this problem is solved by using a device featuring a housing that is attached to the pipe-shaped line, at least one arched guide pipe placed in the housing and projecting into the line for guiding the cable through a bore drilled into the wall of the line, as well as multiple ring-shaped sealing elements tightly enclosing the cable.

The advantages realized by virtue of the invention mainly consist of the fact that sealed insertion and extraction is ensured even in the high-pressure environment of the pipe-shaped line. Thus, not only will there be no leakage at the sites of insertion and extraction of the medium transported in the line, but the occurrence of contamination inside the pipe-shaped line is infallibly prevented. This is of great significance when using fresh water lines for the laying of cable. The arched guide pipe projecting into the line permits simple and safe insertion and extraction into or from the pipe-shaped line, as well as simple and safe laying of the cable on the ground of the line or lifting the cable from the ground, without the risk of damaging the cable, for example, a transmission cable featuring sensitive optical fibers. Moreover, the device according to the invention can be manufactured in a simple and inexpensive manner and mounted to the line, so that the engineering cost of cable installation, as compared to laying cable directly in the ground, may be contained even in the case of many participant connections and branches as well as frequent barriers set up in the pipe-shaped line. A system with the device according to invention for the insertion and/or extraction of cable is particularly suitable for laying optical cable in supply and disposal mains of an urban or regional supply system as part of the installation of an urban or regional telecommunication network.

The characteristics listed in the dependent claims render the inventions suitable for continued developments and improvements.

To infallibly prevent germ formation or contamination of the medium transported in the pipe-shaped line, it is of a certain advantage if the guide pipe is made from stainless steel or plastic.

It is of particular advantage if the housing features two arched guide pipes projecting into the pipe-shaped line. This way, it is possible to create a branch or circumvent one of the barriers set up in the pipe-shaped line with a single device according to the invention by extracting the cable from the pipe-shaped line through one of the two arched guide pipes and reinserting the same or another cable into the line through the other arched guide pipe.

Therefore, it makes insertion or extraction of the cable easier if the two arched guide pipes project into the pipe-shaped line in opposite directions and if the two guide pipes are arranged in the shape of an X.

With regard to sealing the sites of insertion or extraction of the cable, it is advantageous if a force effective in the guiding direction of the cable is applied to the sealing elements by means of a screw joint.

In order to simplify laying the cable in the pipe-shaped line and in the interest of only a brief disruption of the supply or disposal operation of the pipe-shaped line caused by the laying of cable, it is advantageous if the housing features a lower portion that is attached to the pipe-shaped line and a flange-like upper portion that is attached to the lower portion and encloses the ring-shaped sealing elements. For purposes of manufacturing a device according to the invention, dividing the housing into two portions allows attaching the lower portion, also referred to as saddle or bore element, to the pipe-shaped line by means of retaining bows, for example, then drilling into the line and, finally, scaling the bore penetrating the wall of the line until the cable is guided into the line using a blind flange.

Particularly when drinking-water lines are used for laying cable, it is advantageous if the guide pipe features at least one opening in its wall, on the end, projecting into the housing. This way, air in the guide pipe can escape, thus reliably preventing the formation of bacteria-friendly air cushions in the upper portion of the guide pipe, which projects into the housing.

For hydrodynamic reasons, it is advantageous if the guide pipe features a section that expands in the direction of the flow and functions as a clearance edge.

BRIEF DESCRIPTION OF THE DRAWING

Three simplified examples of embodiments of the invention are represented in the drawings and detailed in the description below.

DETAILED DESCRIPTION OF THE INVENTION

Figure 1:
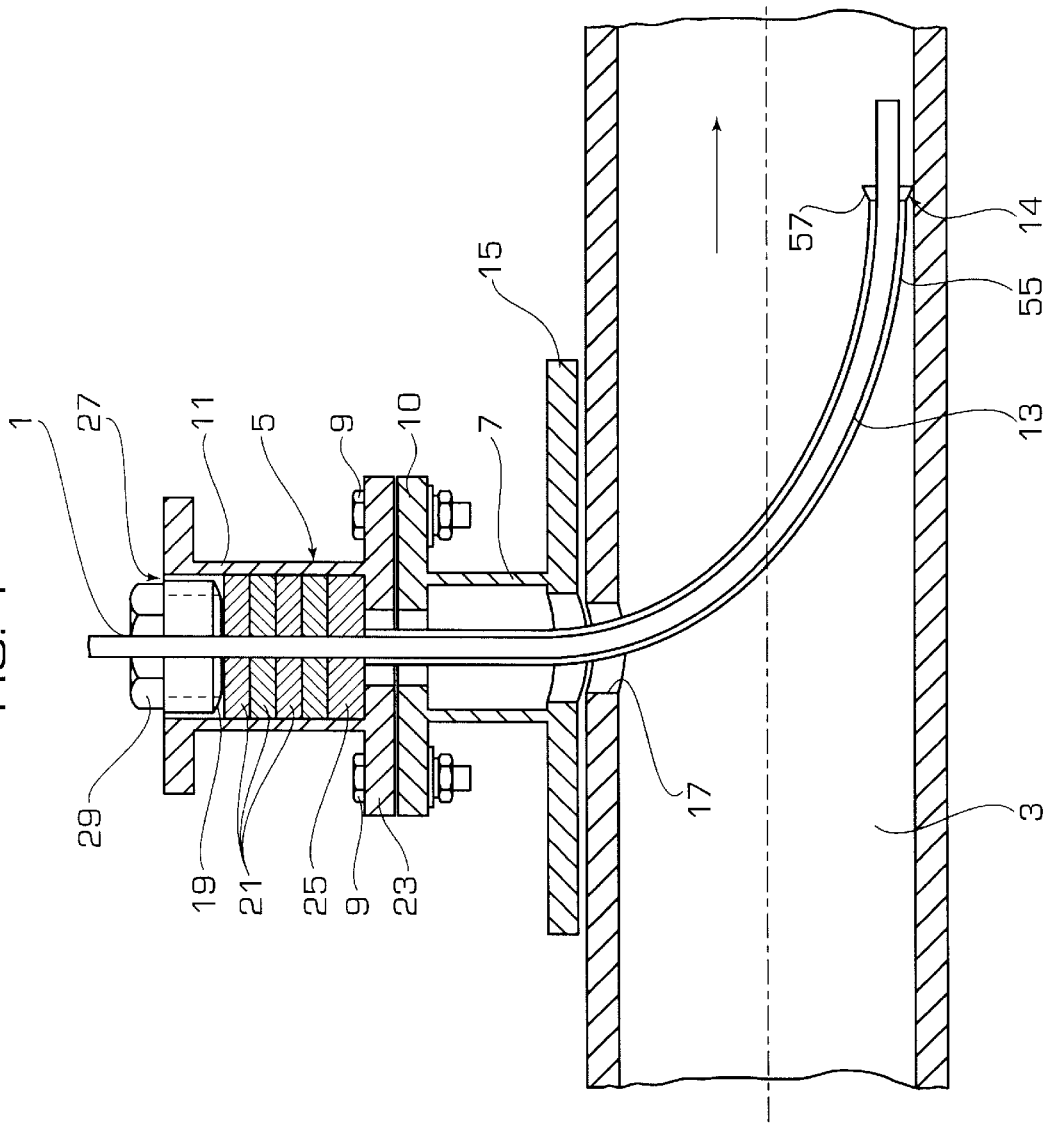
FIG. 1 shows a first example of an embodiment of a device according to the invention.

As demonstrated by the embodiment example shown in FIG. 1, the device for the insertion or extraction of a cable 1 such as an optical transmission cable, into or from a pipe-shaped line 3, which is a fresh water line laid underground, features a housing 5. The housing 5 is placed tightly on the pipe-shaped line 3 using, for example, a saddle-shaped foot element 15 of its pipe-shaped lower portion 7, which commonly is also referred to as saddle or bore element, and attached to the pipe-shaped line 3 by means of retaining bows not shown in FIG. 1. Aside from the lower portion 7 attaching it to the pipe-shaped line 3, the housing 5 features a flange-like upper portion 11, which is tightly secured, by several screws 9, for example, to an attachment flange 10 of the lower portion 7, the former being intended to face away from the foot element 15 of the lower portion 7. Within the housing 5, which is essentially shaped like a pipe, an arched guide pipe 13 is to be placed, which extends, for example, starting from the upper portion 11 of the housing 5, through the lower portion 7 with its foot element 15 and through a bore 17 previously drilled through the wall of the pipe-shaped line 3, all the way into the pipe-shaped line 3. In the embodiment example shown, the arched guide pipe 13 reflects the dimensions of the pipe-shaped line 3 and ends near the floor of the pipe-shaped line 3, more or less pointing in its longitudinal direction. This represents an advantage because a cable 1 inserted into the line 3 by the guide pipe 13 can be inserted into the line 3 and laid on the ground of line 3 in a simple and safe fashion without great mechanical stress, and a cable can be inserted into the guide pipe 13 from the line 3 and extracted by the guide pipe 13 from the line 3 without great difficulty. To prevent contamination of the line 3, which may be used to transport drinking water, or of the drinking water transported therein, the guide pipe 13 is made from stainless steel, for example. However, it could also be made from a suitable plastic. For hydrodynamic reasons, this embodiment example includes, at the end 55 of the guide pipe 13 projecting into line 3, a section 57, which expands in the indicated direction of the flow of the medium transported by line 3 and functions as a clearance edge 57.

To prevent leakage, at the site of cable insertion or cable extraction, of the medium transported by the pipe-shaped line 3 (e.g., fresh water) from the line 3 or the housing 5 of the device, it is to be equipped, for example, with multiple sealing elements 21 arranged on top of one another in the guiding direction of the cable 1 in the pipe-shaped upper portion 11 of the housing 5 featuring a multiple-stage longitudinal bore 19. Assuming their number to be four, these sealing elements 21 cling tightly both to the coating of the cable 1 and to the inner side of the wall of the upper portion 11 in the radial direction and thus prevent leakage of the medium transported in line 3 to the outside and contamination of the inside of the housing 5 between the coating of the cable 1 and the walls of the upper portion 11 of the housing 5. The former applies even to high-pressure environments in the pipe-shaped line 3 of 15 bar and more. In addition, placed against support step 23, which faces inside in the radial direction and is located at the end of the upper portion 11 facing the lower portion 7, is a ring-shaped sealing ring 25, which ensures effective sealing between the coating of the guide pipe 13 and the inner side of the wall of the upper portion 11 of the housing 5. To maintain the sealing elements 21 and the sealing ring 25 in their respective positions and to ensure safe and tight adherence of the sealing elements 21 and the sealing ring 25 to one another as well as to the coating of the cable 1 or the guide pipe 13 and the wall of the upper portion 11, a screw joint 27 is to be installed at the end of the upper portion 11 facing away from the lower portion 7 of the housing 5, which is formed, for example, by a sealing screw 29 screwed into the longitudinal bore 19 of the upper portion 11, or a corresponding cap nut. The ring-shaped sealing elements 21 are designed in such a fashion as to allow the cable 1 to be easily pulled through the device before the sealing screw 29 or a cap nut is tightened.

Figure 2:
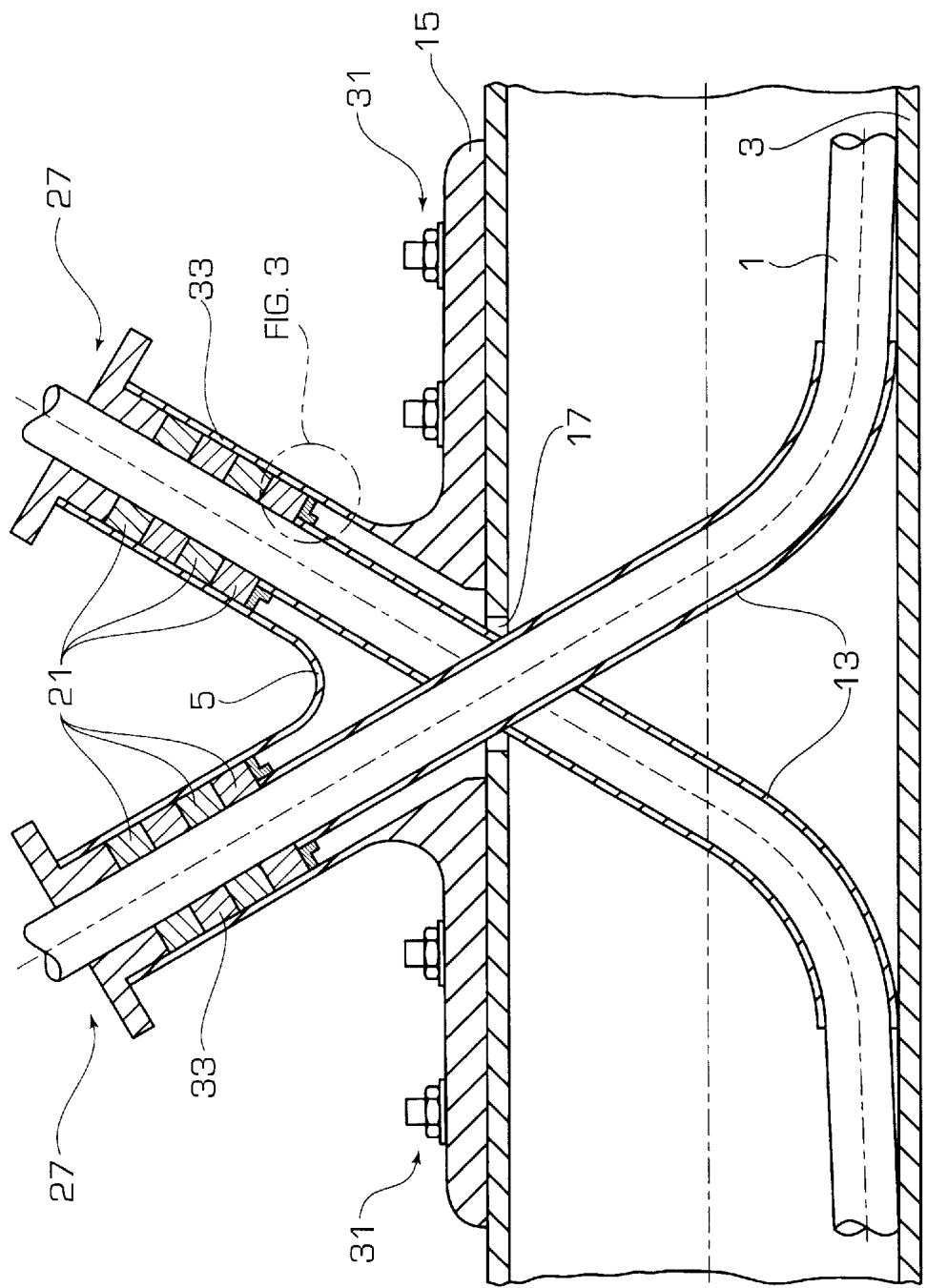
FIG. 2 shows a second example of an embodiment of a device according to the invention.
Figure 3:
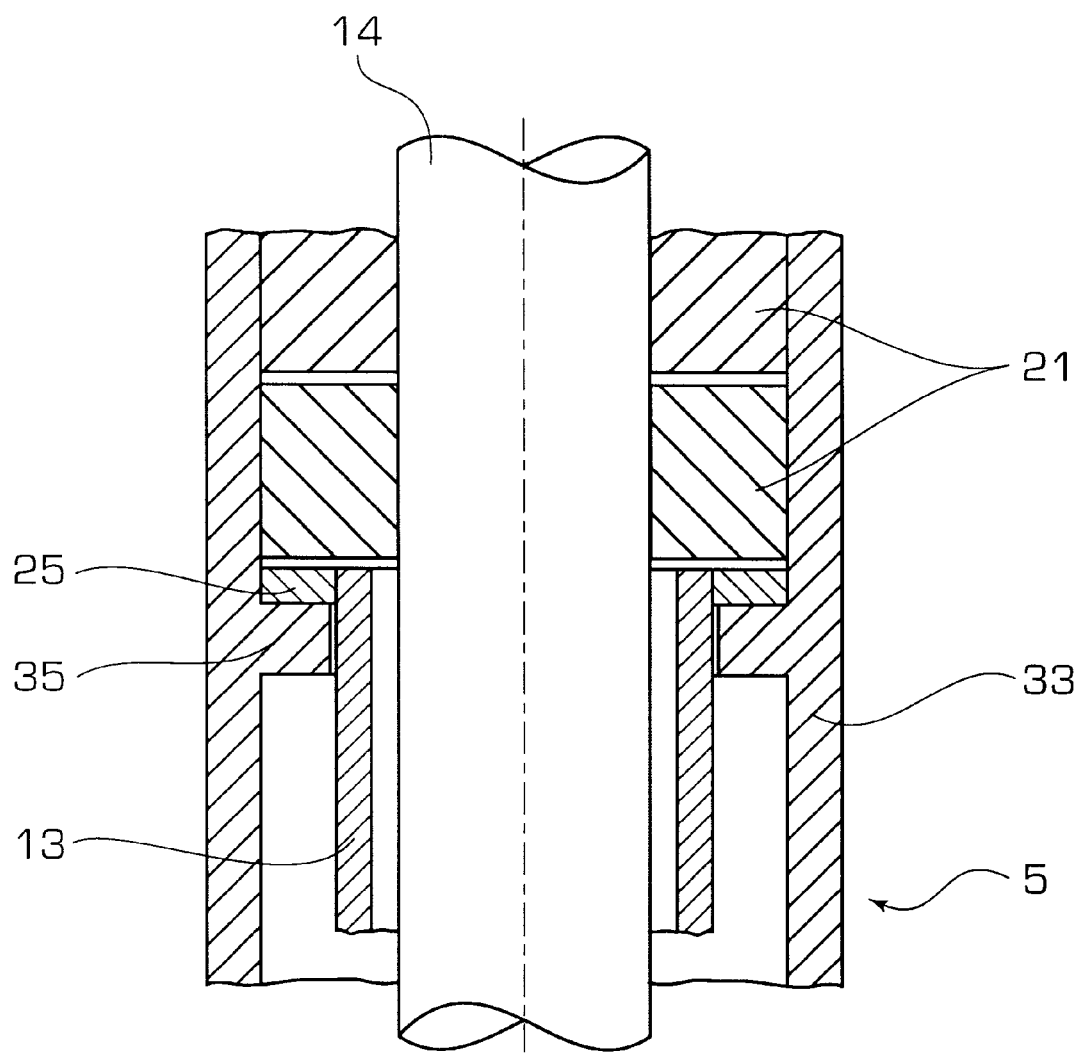
FIG. 3 shows an elevation of the detail X in FIG. 2.

As shown by the examples in FIGS. 2 and 3, the device for extracting a cable 1 from a pipe-shaped line 3 and for inserting the cable 1 or another cable into the pipe-shaped line 3 features a housing 5, which is connected closely and tightly to the pipe-shaped line 3 at its saddle-like foot element 15 by means of screwed joint 31. In this embodiment example, two pipe-shaped, slanted sections 33 of the housing 5 adhere to the foot element 15 of the housing 5 that, with the exception of the foot element, is shaped like a V, for example. Such a device combining the insertion and extraction of cable might prove advantageous when used to circumvent a blocking device set up in the pipe-shaped line 3 or to create a participant connection. For this purpose, the device features two arched guide pipes 13, which are made from stainless steel or plastic, for example. The two guide pipes 13, which are slanted against one another in the shape of an X, extend, each starting from the pipe-shaped sections 33 of the housing 5 enclosing the corresponding end of the guide pipe 13 at a radial distance, through a bore 17 previously drilled through the wall of the pipe-shaped line 3, all the way to the ground of the pipe-shaped line 3 in opposite directions. That way, a single device suffices to extract the cable 1 from the line 3 and to reinsert the cable 1 or another cable into the pipe-shaped line 3. While the device shown is especially suited for creating participant connections, it is of particular advantage to the circumvention of blocking devices in the pipe-shaped line if the two arched guide pipes 13 are arranged in a manner similar to the embodiment example shown in FIG. 1, penetrating the walls of the pipe-shaped line 3 at an angle about vertical to the longitudinal direction of the pipe-shaped line 3, differing only in that they project into the pipe-shaped line 3 in opposite directions.

Similar to the first embodiment example shown in FIG. 1, facing away from the pipe-shaped line 3, multiple sealing elements 21—four, for example—are arranged on top of one another in the guiding direction of the cable 1 in each of the two pipe-shaped sections 33 of the housing 5 and adhere closely to the coating of the cable 1 and the inner wall of the section 33 of the housing 5. Facing the pipe-shaped line 3, there is a support step 35 facing inside in the radial direction in each pipe-shaped section 33, which supports a ring-shaped sealing ring 25 in the radial direction. With its front facing away from the support step 35, this sealing ring 25 tightly adheres to one of the sealing elements 21 as well as, in the radial direction, to the coating of the corresponding guide pipe 13 as well as the inner side of the wall of the corresponding section 33 of the housing 5. At their ends facing away from the foot element 15, the two sections 33 are each equipped with a flange-shaped screw joint 27, which presses the sealing elements 21 as well as the sealing ring 25 tightly together in the guiding direction of the cable and maintains their positions, thus ensuring infallible sealing performance between the cable 1 or guiding pipe 13 and the wall of the housing 5 of the device.

Figure 4:
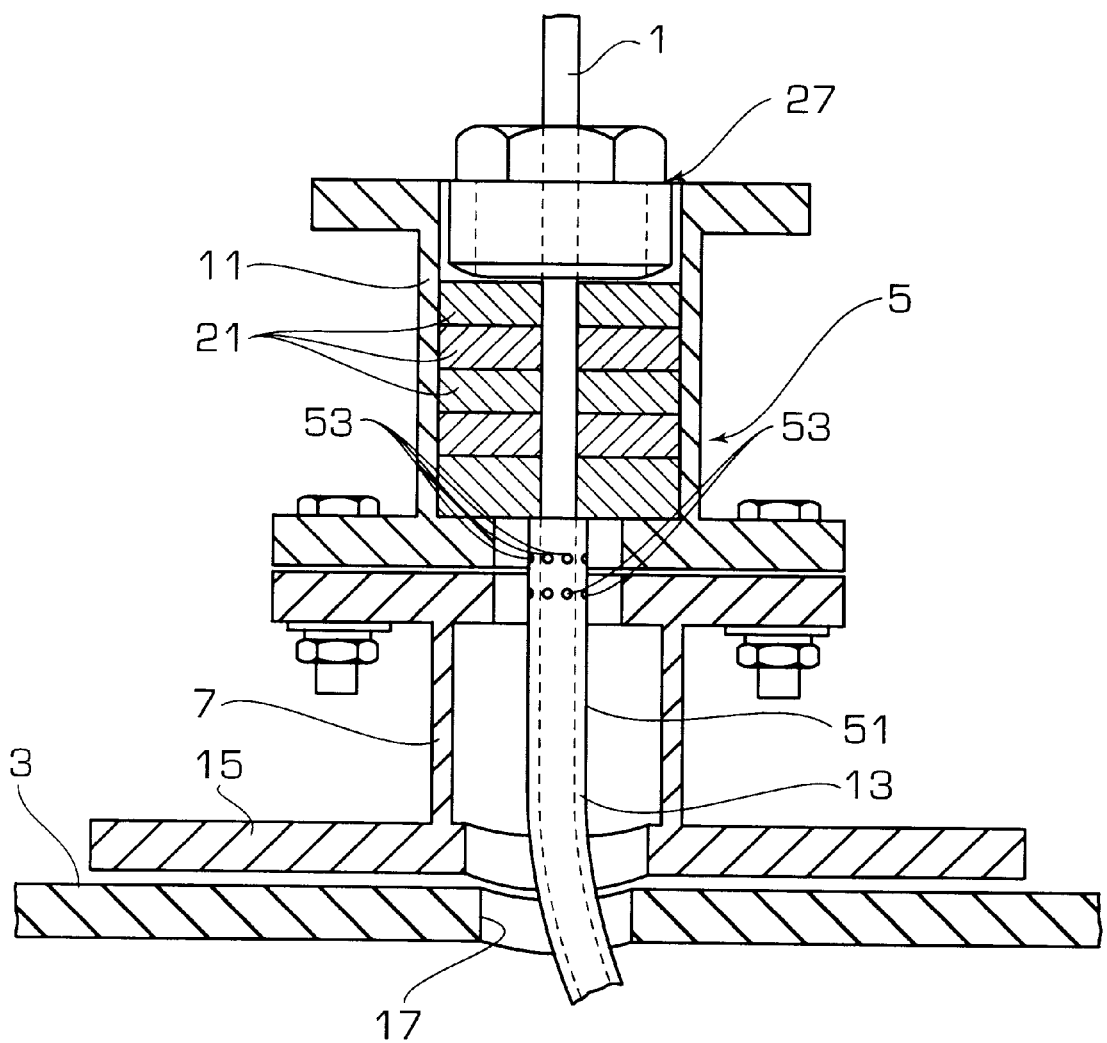
FIG. 4 shows a fourth example of an embodiment of a device according to the invention.

Shown in FIG. 4, the third embodiment example of the device according to the invention essentially differs from the first embodiment example shown in FIG. 1 in that the guide pipe 13 features multiple openings 53 in its wall at the end 51 projecting into the housing 5. These openings 53 make it possible for air in the guide pipe 13, which collects in the upper area of the guide pipe 13, to escape from the guide pipe 13. This is of particular advantage when cable is laid in drinking water lines, because the collected, immobile air in the upper end 51 of the guide pipe 13 projecting into the housing 5 favors bacteria formation.

What is claimed is:

1. A device for at least one of insertion and extraction of cable, particularly an optical transmission cable, relative to a pipe-shaped line, said device comprising: a flange-like housing attached to the outside circumference of the pipe-shaped line, at least one arched guide pipe placed in the flange-like housing and projecting into the pipe-shaped line and extending longitudinally along a bottom thereof for guiding the cable through a bore drilled into a wall of the line as and multiple ring-shaped sealing elements tightly enclosing the inserted cable.

2. A device according to claim 1, wherein the guide pipe is made from stainless steel.

3. A device according to claim 1, wherein the guide pipe is made from plastic.

4. A device according to claim 1, wherein the two guide pipes are placed in the housing.

5. A device according to claim 4, wherein two arched guide pipes project into the line in opposite directions.

6. A device according to claim 1, wherein a force effective in the guiding direction of the cable is applied to the sealing elements by means of a screw joint.

7. A device according to claim 1, wherein the housing features a lower portion attached to the pipe-shaped line and a flange-like upper portion, which encloses the ring-shaped sealing elements and is attached to the lower portion.

8. A device according to claim 1 wherein the guide pipe features at least one opening in a wall of said pipe at the end projecting into the housing.

9. A device for the insertion and extraction of cable, particularly an optical transmission cable, into or from a pipe-shaped line, said device comprising a flange-like housing attached to the outside circumference of the pipe-shaped line at least one arched guide pipe placed in the flange-like housing and projecting into the pipe-shaped line and extending longitudinally along a bottom thereof for guiding the cable through a bore drilled into a wall of the line and multiple ring-shaped scaling elements within the housing tightly enclosing the inserted cable, wherein the two guide pipes are placed in the housing and the two guide pipes are arranged in the shape of an X.

10. A device for the insertion and extraction of cable, particularly an optical transmission cable, into or from a pipe-shaped line, said device comprising a flange-like housing attached to the outside circumference of the pipe-shaped line, at least one arched guide pipe placed in the flange-like housing and projecting into the pipe-shaped line and extending longitudinally along the bottom thereof for guiding the cable through a bore drilled into a wall of the line and multiple ring-shaped sealing elements within the housing tightly enclosing the inserted cable, wherein the guide pipe features a section that expands in the direction of the flow at the end projecting into the line.

11. A device according to claim 1 wherein said sealing elements are adjacent to and in contract with one another in the axial direction of the cable.

* * * * *